United States Patent
Domesle et al.

(10) Patent No.: US 6,475,951 B1
(45) Date of Patent: Nov. 5, 2002

(54) CATALYST MATERIAL

(75) Inventors: Rainer Domesle, Alzenau-Kälberau; Ulrich Göbel, Hattersheim; Lothar Mussmann, Offenbach; Egbert Lox, Hanau; Thomas Kreuzer, Karben, all of (DE)

(73) Assignee: Degussa-Huls Aktiengessellschaft, Frankfurt am Main (DE)

( * ) Notice: Subject to any disclaimer, the term of this patent is extended or adjusted under 35 U.S.C. 154(b) by 0 days.

(21) Appl. No.: 09/513,341

(22) Filed: Feb. 25, 2000

(30) Foreign Application Priority Data

Feb. 6, 1999 (DE) .......................... 199 08 394

(51) Int. Cl.[7] .......................... B01J 23/00; B01J 23/40; B01J 23/42; B01J 23/58; B01J 23/56
(52) U.S. Cl. ................ 502/325; 502/326; 502/327; 502/328; 502/332; 502/333; 502/334; 502/339
(58) Field of Search ................ 502/303, 304, 502/306, 313, 314, 327, 328, 333, 334, 339, 325, 439, 326, 332

(56) References Cited

U.S. PATENT DOCUMENTS

| | | | | |
|---|---|---|---|---|
| 3,867,312 A | * | 2/1975 | Stephens | 252/462 |
| 4,018,670 A | * | 4/1977 | Sinfelt et al. | 208/140 |
| 4,170,573 A | * | 10/1979 | Ernest et al. | 252/462 |
| 4,402,869 A | * | 9/1983 | Tauster et al. | 252/471 |
| 4,714,694 A | * | 12/1987 | Wan et al. | 502/304 |
| 4,727,052 A | * | 2/1988 | Wan et al. | 502/327 |
| 4,843,056 A | | 6/1989 | Matsumoto et al. | |
| 4,963,521 A | | 10/1990 | Engler et al. | |
| 5,001,103 A | | 3/1991 | Koberstein et al. | |
| 5,013,705 A | | 5/1991 | Koberstein et al. | |
| 5,045,521 A | | 9/1991 | Lox et al. | |
| 5,081,095 A | * | 1/1992 | Bedford et al. | 502/304 |
| 5,155,085 A | * | 10/1992 | Hamano et al. | 502/303 |
| 5,179,059 A | * | 1/1993 | Domesle et al. | 502/303 |
| 5,314,854 A | * | 5/1994 | Galperin | 502/66 |
| 5,496,788 A | * | 3/1996 | Domesle et al. | 502/333 |
| 5,672,557 A | * | 9/1997 | Williamson et al. | 502/303 |
| 5,801,114 A | | 9/1998 | Durand et al. | |
| 5,928,981 A | * | 7/1999 | Leyer et al. | 502/64 |
| 5,958,829 A | * | 9/1999 | Domesle et al. | 502/333 |
| 5,972,820 A | * | 10/1999 | Kharas et al. | 501/127 |
| 6,040,265 A | * | 3/2000 | Nunan | 502/242 |
| 6,149,877 A | * | 11/2000 | Ogai | 422/180 |

FOREIGN PATENT DOCUMENTS

| | | |
|---|---|---|
| DE | 29 07 106 | 9/1980 |
| EP | 0 170 841 A1 * | 2/1986 |
| EP | 0 558 343 | 9/1993 |
| EP | 0 624 399 | 11/1994 |
| EP | 0 885 650 A2 | 12/1998 |
| EP | 0 885 650 A3 | 3/1999 |

OTHER PUBLICATIONS

European Search Report corresponding to counterpart appln. EP 00 10 3866.
Patent Abstracts of Japan, vol. 006, No. 239 (C–137), Nov. 26, 1982 & JP 57 140649.

* cited by examiner

*Primary Examiner*—Stanley S. Silverman
*Assistant Examiner*—Cam N. Nguyen
(74) *Attorney, Agent, or Firm*—Kalow & Springut, LLP

(57) ABSTRACT

A powdered catalyst material based on aluminum oxide, which contains at least one basic metal oxide and at least one noble metal from the platinum group of the Periodic Table of Elements in addition to aluminum oxide. The catalyst material is obtainable by loading a support material already stabilized by basic oxides by renewed impregnation with further basic oxides. After drying and calcining this post-impregnated material at temperatures below 800° C., the catalytically active noble metals are also incorporated into the support material by impregnation.

5 Claims, 4 Drawing Sheets

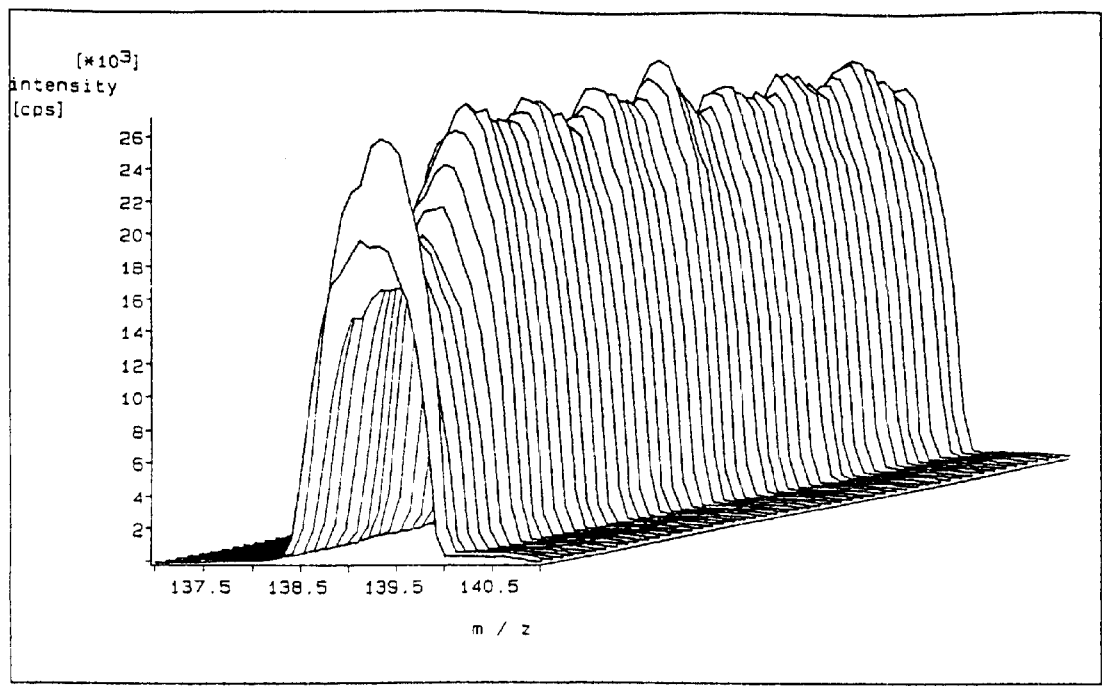
Figure 1:   SIMS depth profile of lanthanum on support material 1.
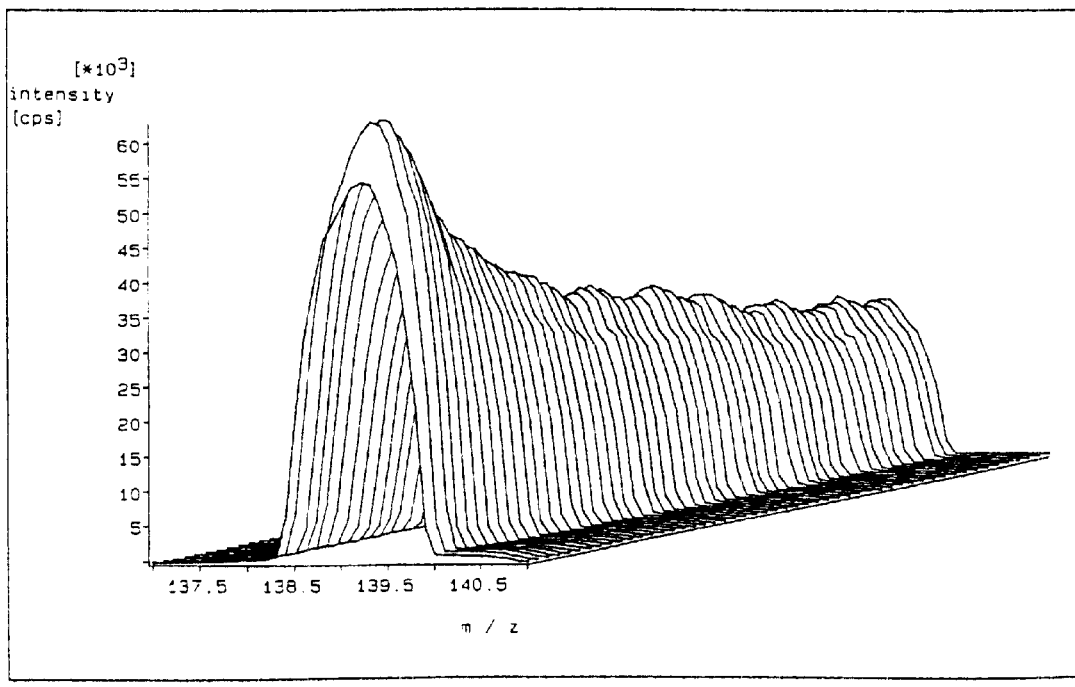
Figure 2:   SIMS depth profile of lanthanum on support material 2

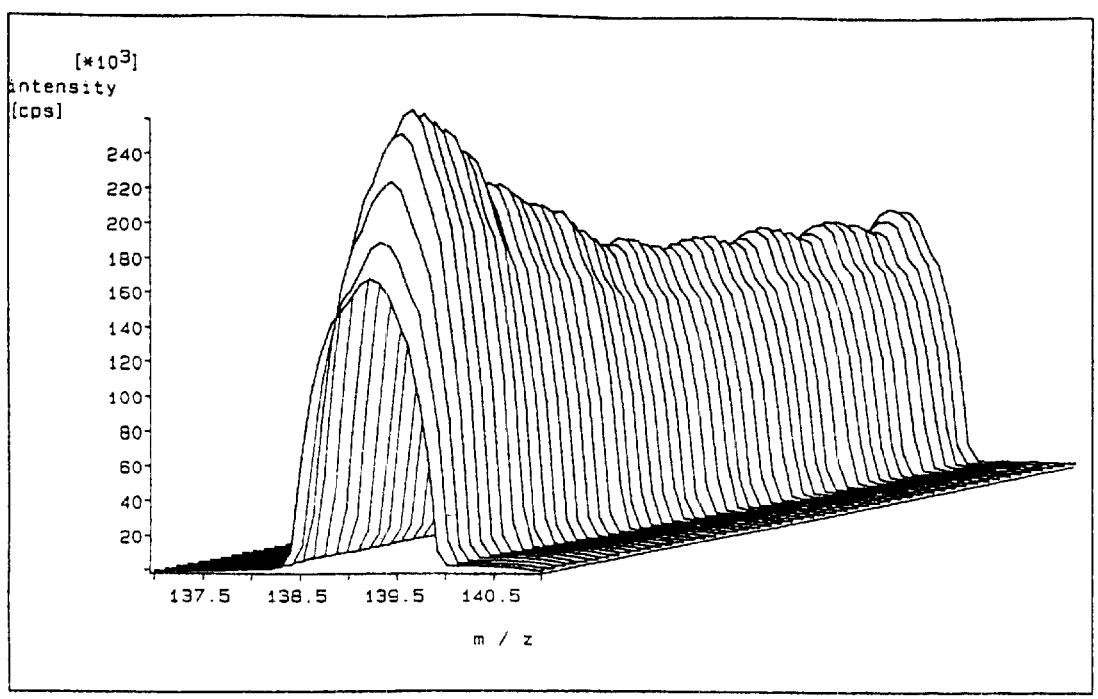
Figure 3: SIMS depth profile of lanthanum on support material 3

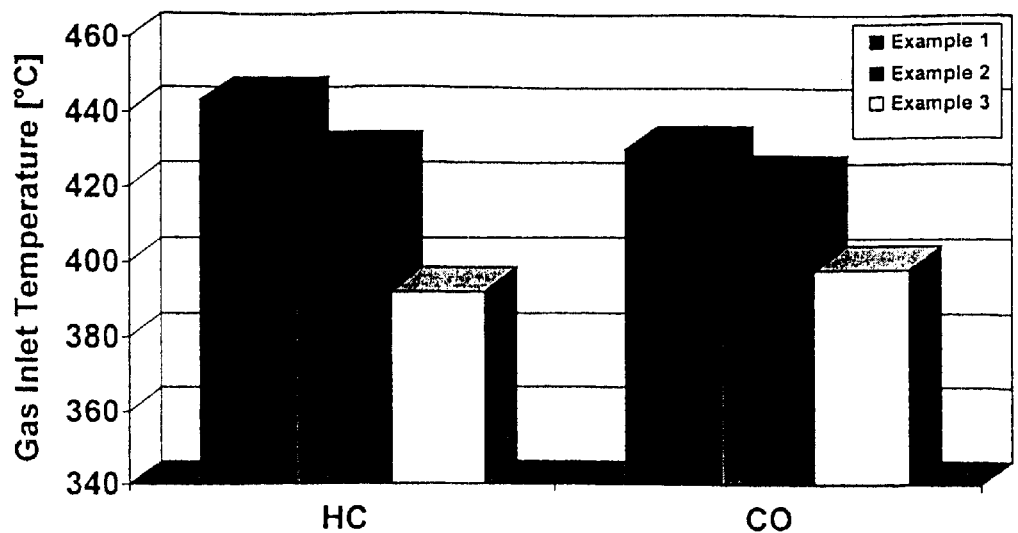

Figure 4:   Temperature at which a 50 % conversion of hydrocarbons (HC) and carbon monoxide (CO) is achieved for catalysts in examples 1 to 3 with a normalized air to fuel ratio of 0.999 and periodic modulation of the air/fuel ratio A/F by ± 0.5 at a frequency of 1 Hz (1 Hz; ± 0.5 A/F).

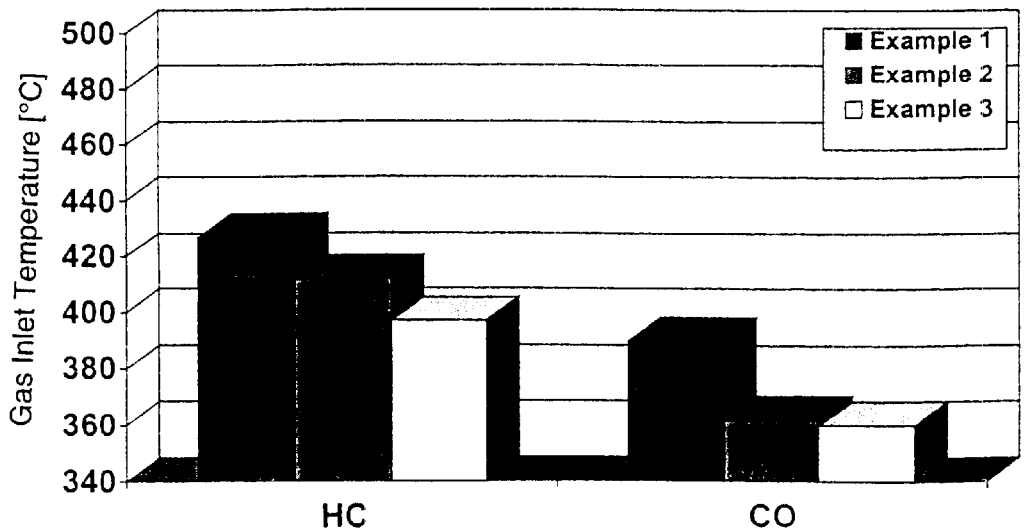

Figure 5:   Temperature at which a 50 % conversion of hydrocarbons (HC) and carbon monoxide (CO) is achieved for catalysts in examples 1 to 3 with a normalized air to fuel ratio of 1.05 (static, with no modulation of A/F)

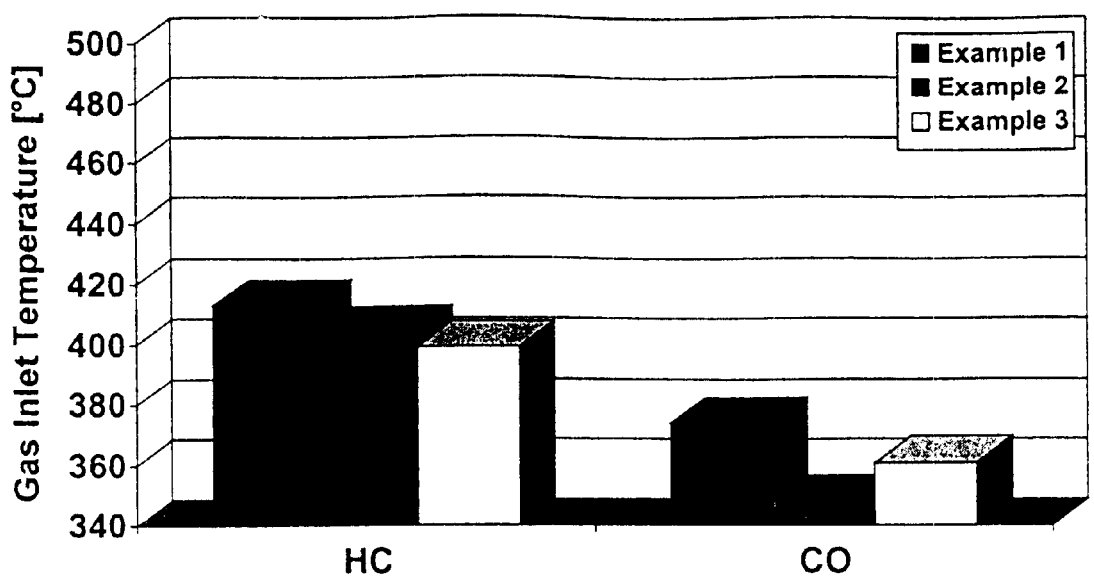
Figure 6: Temperature at which a 50 % conversion of hydrocarbons (HC) and carbon monoxide (CO) is achieved for catalysts in examples 1 to 3 with a normalized air to fuel ratio of 1.1 (static, with no modulation of A/F).

CATALYST MATERIAL

FIELD OF THE INVENTION

The invention provides a powdered catalyst material based on aluminum oxide, which contains at least one basic metal oxide and at least one noble metal from the platinum group of the Periodic Table of Elements, as well as aluminum oxide. The catalyst according to the invention has outstanding thermal stability with a high surface area and a high, aging-stable dispersion of the catalytically active components. It is particularly suitable for the production of catalysts for the treatment of exhaust gases from internal combustion engines.

BACKGROUND OF THE INVENTION

Aluminum oxide is frequently used as a support material for the catalytically active elements from the platinum group. It is obtainable in so-called high surface area modifications on whose surface the noble metals from the platinum group can be deposited in a high dispersion.

High surface area materials in the context of this invention are materials with a specific surface area of more than 10 $m^2/g$, determined by evaluating nitrogen adsorption isotherms in accordance with DIN 66132. Aluminum oxides which satisfy this condition are called active aluminum oxides. These include chi, kappa, gamma, delta, theta and eta aluminum oxide (see Ullmann's Encyclopedia of Industrial Chemistry, vol. A1, 561–562, 1985, which is incorporated herein by reference in its entirety).

For optimum use of the catalytic activity of the expensive platinum group metals, they have to be deposited in a very high dispersion on the support material. Efforts are made to produce crystallite sizes for the noble metals of between 1 and 10 nm on the surface of the support material. The noble metals are deposited, for example, by impregnating the support material with aqueous solutions of precursor compounds of the noble metals. Then the impregnated material is dried and calcined to decompose the noble metal compounds, optionally under reducing conditions.

Four properties of the catalyst material obtained in this way are important for later use in catalytic processes:

a) the surface area of the material, measured as the specific BET surface area according to DIN 66132;

b) the resistance of the crystallographic structure and surface area of the support material to stresses which occur during the catalytic process, in particular to high temperatures;

c) the dispersion of the catalytically active components on the surface area of the support material;

d) the resistance of the dispersion of catalytically active components to stresses which occur during the catalytic process, in particular to high temperatures.

In order to stabilize the crystallographic structure and the surface area of the aluminum oxide used as support material, this is frequently doped with basic metal oxides such as, for example, barium oxide and lanthanum oxide, cerium oxide, or other rare earth oxides or mixtures of these oxides. This results in a slowing of the conversion into thermally stable, but low surface area, alpha aluminum oxide. The amount of doping components required for this purpose is 1 to 10 wt. %, with respect to the total weight of doped aluminum oxide.

U.S. Pat. No. 3,867,312 describes the preparation of a support material based on aluminum oxide which contains oxides of the lanthanides uniformly distributed in the support material. This slows down phase conversion of the aluminum oxide. The lanthanide oxides may be present in the support material in concentrations of 1 to 45 wt. %, with respect to the aluminum oxide. The support material is obtained, for example, by melting lanthanum acetate and aluminum nitrate together by heating and by converting these into the oxides by increasing the temperature further to 600° C. This patent is incorporated herein by reference in its entirety.

U.S. Pat. No. 4,170,573 describes a catalyst material in the form of a support material consisting of cerium oxide, lanthanum oxide-and aluminum oxide, onto which platinum group metals are deposited. To prepare the support material, active aluminum oxide is impregnated with a solution of lanthanum nitrate, dried and calcined for one hour at a bed temperature between 1223 and 1253° C. Then the material is impregnated with an aqueous solution of cerium nitrate in a similar way, dried and calcined. The catalytically active noble metals are deposited onto this support material using ammonium/sulfito complexes of these metals. The surface area of the materials prepared in this way is less than 50 $m^2/g$. This patent is incorporated herein by reference in its entirety.

EP 0 170 841 A1 describes a catalyst which has 1 to 10 wt. % of lanthanum oxide as stabilizer, 1 to 20 wt. % of cerium oxide as promoter, at least 0.5 to 5 wt. % of an alkali metal oxide as promoter, and one or more platinum group metals on an aluminum oxide support material. Lanthanum oxide and the promoters are incorporated in the support material which is present in the form of pellets by impregnation. After impregnating the pellets with a salt of lanthanum, the support is calcined at temperatures between 800 and 1100° C. in order to convert the salt into lanthanum oxide and for thermal stabilization purposes. This patent is incorporated herein by reference in its entirety.

EP 0 171 640 A2 describes a catalyst which contains a composite material consisting of aluminum oxide, lanthanum oxide, cerium oxide and at least one platinum group metal. Lanthanum and cerium are introduced into the aluminum oxide in sequence by impregnating with lanthanum nitrate and cerium nitrate, and are then converted into the oxides by calcining at a temperature of at least 983° C. The resulting material has a surface area of less than 50 $m^2/g$. This patent is incorporated herein by reference in its entirety.

Another process for preparing a thermally stable support material based on aluminum oxide is the solgel process. This process provides a homogeneous distribution of aluminum and rare earths, at the atomic level, by the co-precipitation of oxidic aerogels of aluminum and rare earths. These materials have a constant ratio by weight of aluminum oxide to rare earth oxide over the entire volume of the solid material. The highly dispersed composite material obtained is then stabilized by calcination. The surface areas which can be produced using this process, with good thermal stability, are substantially higher than those achieved by the previously described impregnation method. Typical values are 100 to 300 $m^2/g$.

The properties of the known processes for preparing a stabilized support material based on aluminum oxide are thus characterized as follows:

In order to stabilize aluminum oxide by impregnation with, for example, lanthanum oxide, the impregnated material has to be calcined at temperatures of more than 800° C. in order to enable diffusion of lanthanum into the inner depths of the particles of aluminum oxide, and incorporation into the crystal lattice of aluminum oxide. The resulting material generally has a surface area of less than 50 m²/g and a substantially homogeneous distribution of doping element over the cross section of the aluminum oxide particles.

Preparing a stabilized support material based on aluminum oxide by co-precipitation provides a support material with a substantially higher surface area than when using the impregnation methods. The doping element is distributed very homogeneously over the cross section of the support particles.

The catalytically active components are mostly applied to these stabilized support materials by impregnation. It is important here to produce a high dispersion of the catalytically active components, which are very stable even under high thermal stresses. This is not always guaranteed with known support materials. In particular, grain enlargement due to diffusion,of the particles to the surface, and aggregation of these, is frequently observed, so the catalytic activity of these materials is reduced by high temperatures.

Thus, the object of the present invention is to provide a catalyst material based on aluminum oxide which has a high surface area and a high dispersion of catalytically active components. The thermal stability of the surface area of the support material and of the dispersion of catalytically active components is intended to be better than those of traditional materials. Another object of the invention is the method of preparing the catalyst material according to the invention.

SUMMARY OF THE INVENTION

These objects are achieved by a powdered catalyst material based on aluminum oxide which contains aluminum oxide, at least one basic metal oxide and, as catalytically active components, at least one noble metal from the platinum group of the Periodic Table of Elements, wherein aluminum oxide and the basic metal oxides form a composite material which acts as support material for the catalytically active components. The catalyst material is obtainable by the following process steps:

a) provision of a powdered aluminum oxide stabilized with basic oxides as support material, which has a specific surface area of more than 80 m²/g, b) impregnation of the support material with a solution of at least one precursor compound of alkaline earth and rare earth metals, c) drying of the impregnated support material and calcination at temperatures below 800° C., d) repetition of process steps b) and c) until the desired loading with basic oxides is achieved, e) renewed impregnation of the material obtained with a solution of precursor compounds of the catalytically active noble metals, and f) finally drying and calcining.

The catalyst material according to the invention is thus obtained by subsequent re-impregnation of a support material already stabilized by basic oxides with precursor compounds of basic oxides.

The expression "stabilized aluminum oxide" in the context of this invention is understood to be a material disclosed in the prior art, the crystallographic structure and specific surface area of which have been stabilized against high temperatures by doping with basic oxides. This is preferably an active aluminum oxide doped with 1 to 10 wt. % of lanthanum oxide. As explained at the beginning, such a material can be obtained by impregnating with precursors of basic oxides followed by calcining at temperatures above 800° C. The material obtained in this way is characterized by a substantially homogeneous distribution of doping elements over the cross section of the powder particles. Alternatively, these materials may also be obtained by a co-precipitation process. These materials are also characterized by a homogeneous distribution of doping elements over the cross section of the powder particles. Due to the requirement that the surface area be at least 80 m²/g, the stabilized aluminum oxides obtained by co-precipitation are most suitable as starting materials for the catalyst material according to the invention.

For the post-impregnation procedure in process step b), aqueous impregnation solutions are preferably used, but organic solutions may also be used. After impregnation in step b), the material is dried at an elevated temperature of, for example, 100 to 200° C., and calcined at below 800° C. in order to convert the precursor compounds into basic oxides. The objective of this calcination step is to convert the precursor compounds into the corresponding oxides, and not forced thermal diffusion of the doping elements into the aluminum oxide lattice. Therefore, temperatures of less than 700° C. are preferably used. The appropriate calcination temperature depends on the precursor compounds used and may be lowered to, for example, 600 to 500° C. when using nitrates.

According to current understanding of the invention, an elevated concentration of basic oxides is produced at the surface of the support material by means of this action. These basic oxides lead to an elevated concentration of hydroxyl groups at the surface which are used as docking points for the precursor compounds of catalytically active noble metals subsequently applied in process step d), and lead to stable anchorage of the noble metal particles on the surface after subsequent calcination in process step e). The result of this step is a catalyst material with high thermal stability of the support and a high dispersion of catalytically active noble metals and very good aging and thermal stability of this dispersion, due to reduced mobility of the noble metal particles on the surface of the support.

The catalyst material according to the invention has a specific BET surface area, measured in accordance with DIN 66132, of more than 80 m²/g. The total pore volume is preferably between 0.3 and 0.9 ml/g.

The stabilized aluminum oxide provided in step a) may have the various crystal structures of the transition oxides of aluminum oxide. In order to stabilize these characteristics, the aluminum oxide contains basic oxides, preferably in concentrations between 0.5 and 20 wt. %, with respect to the total weight of stabilized aluminum oxide or support material.

Due to subsequent impregnation, additional basic oxides are deposited, preferably at a concentration of 0.5 to 15 wt. %, with respect to the total weight of support material, so that the total concentration of basic oxides in the support material is 1 to 35 wt. %.

Different basic oxides may be combined in the catalyst material according to the invention, that is, the basic oxides used to stabilize the starting material do not have to be identical to the oxides deposited on the support material in process steps b) and c).

The catalyst material according to the invention is preferably stabilized and doped with basic oxides from the alkaline earth and rare earth oxides, in particular with oxides of the elements magnesium, calcium, strontium, barium, lanthanum, cerium, praseodymium, neodymium, samarium, europium, terbium and ytterbium. These oxides may be present individually or as a mixture. Stabilization and doping of the aluminum oxide with oxides of lanthanum, cerium, or mixtures thereof, is especially advantageous.

Suitable precursors of the basic oxides are any soluble compounds of the alkaline earth and rare earth metals. These include soluble organic complex compounds, acetates, nitrates and chlorides. Organic complex compounds, acetates and nitrates, which are deposited onto the treated support material using a known impregnation process, are preferably used. The pore volume impregnation method, in which the precursor compounds are dissolved in a volume of solvent which corresponds to about 60 to 110% of the absorption capacity of the initially introduced support material, is preferably used. If the solubility of the precursor compound is not sufficiently high to apply the desired amount in one step, then the impregnation procedure may be repeated several times, until the desired amount has been deposited on the support material.

To apply the catalytically active noble metals, known impregnation techniques may also be used, wherein the pore volume impregnation method is also preferred for the noble metals. According to the invention, metals from the platinum group are used as noble metals, in particular platinum, palladium, rhodium and iridium, which may be deposited individually or in various combinations and mixing ratios at concentrations of 0.01 to 5 wt. %, with respect to the total weight of catalyst material.

As explained above, the catalyst material according to the invention has an elevated concentration of basic oxides at the surface. Tests using secondary ion mass spectrometry (SIMS) have shown that, in particular in an outer edge zone with a thickness of less than 100 atomic layers, the concentration of the metals forming the basic oxides, relative to aluminum, is at least 20% greater than at a depth with a thickness of more than 100 atom layers.

Accordingly, the invention also provides a powdered catalyst material based on aluminum oxide which contains at least one basic metal oxide and, as catalytically active components, at least one noble metal from the platinum group in the Periodic System of Elements in addition to aluminum oxide, wherein aluminum oxide and the basic metal oxides form a composite material which acts as a support material for the catalytically active components, characterized in that the catalyst material has a specific surface area of more than 80 m$^2$/g, and the ratio of the SIMS intensities of the metals forming the basic metal oxides to aluminum at the surface of the powder particles is at least 20% greater than at a depth of more than 100 atomic layers from the surface of the particles.

Considerations governing the choice of basic oxides, catalytically active noble metals, and concentrations, are the same as those mentioned above. In particular, the catalyst material has a total concentration of basic oxides of between 1 and 35 wt. %, with respect to the total weight of catalyst material.

Enrichment of the basic oxides at the surface of the support material increases the concentration of hydroxyl groups at the surface of the particles and these are used as docking points for the precursor compounds of platinum group metals when depositing the catalytically active platinum group metals. The increased functionalization of the surface leads to a very high dispersion of deposited noble metals, and also improves anchorage of the deposited noble metal crystallites on the surface, so that the risk of neighboring crystallites aggregating due to increased mobility at high temperatures is reduced.

Surface enrichment of the basic oxides in accordance with the invention is substantially restricted to a very thin edge zone with a thickness of a few atomic diameters. The variation in concentration of elements in the edge zone can be measured using secondary ion mass spectrometry (SIMS). The application of secondary ion mass spectrometry to investigating the surfaces of powders is described in "SIMS/XPS Study on the Deactivation and Reactivation of BMPI Catalysts Used in the Vapor Phase Beckmann Rearrangement" by P. Albers et al. Journal of Catalysis, vol. 176, 1998, 561–568, which is incorporated herein by reference in its entirety.

The measurements are performed as follows: the loose powder is introduced, in a sample holder, into the measurement chamber of a mass spectrometer, and this is evacuated down to a pressure of $10^{-8}$ to $10^{-9}$ mbar. Then the powder surface is bombarded with 5 keV argon ions, with simultaneous charge compensation, so that the outer atoms are stripped off, layer by layer. The secondary ions emitted during this process are analyzed. Their distribution with respect to each other corresponds to the distribution of the corresponding elements in the surface of the sample. To normalize the experimental values, the ratios of the measured intensities of secondary ions to the intensity of aluminum ions are calculated. This procedure provides a picture of the distribution of elements as a function of the depth of abrasion relative to the main element in the support material.

The area measured, that is, the surface of powder bombarded with argon ions is 4×4 mm$^2$, and is thus many times greater than the cross-sectional area of the individual powder particles, which have a diameter of only between 0.1 and 50 μm. The measurement thus provides the average distribution of elements over many powder particles. This means that random results are largely excluded.

BRIEF DESCRIPTION OF THE DRAWINGS

The invention is now explained in more detail using a few examples. The following figures are provided:

FIG. 1: SIMS depth profile of lanthanum for support material 1;

FIG. 2: SIMS depth profile of lanthanum for support material 2;

FIG. 3: SIMS depth profile of lanthanum for support material 3;

FIG. 4: Temperature at which a 50% conversion of hydrocarbons (HC) and carbon monoxide (CO) is achieved for catalysts in examples 1 to 3 with a normalized air to fuel ratio of 0.999 and periodic modulation of the air/fuel ratio A/F by±0.5 at a frequency of 1 Hz (1 Hz;±0.5 A/F);

FIG. 5: Temperature at which a 50% conversion of hydrocarbons (HC) and carbon monoxide (CO) is achieved for catalysts in examples 1 to 3 with a normalized air to fuel ratio of 1.05 (static, with no modulation of A/F);

FIG. 6: Temperature at which a 50% conversion of hydrocarbons (HC) and carbon monoxide (CO) is achieved for catalysts in examples 1 to 3 with a normalized air to fuel ratio of 1.1 (static, with no modulation of A/F).

DETAILED DESCRIPTION OF THE INVENTION

The following support materials were used or prepared to produce car exhaust gas catalysts using catalyst materials according to the invention:

Support Material 1

A commercially available aluminum oxide stabilized with 3 wt. % of lanthanum oxide with a BET surface area in the freshly calcined state of 143 m$^2$/g is used as support material 1.

Support Material 2

To prepare support material 2, 2000 g of support material 1 were impregnated with 856 g of a lanthanum ethylene diamine tetra acetate solution with a lanthanum content of 2.4 wt. %, using the pore volume impregnation method. The impregnation solution had a pH of 5. The powder obtained in this way was then dried for 12 hours at 120° C. and then calcined for 1 hour at 750° C. in air. Due to this subsequent impregnation, an additional 1 wt. % of lanthanum oxide was deposited on the support material, so that the total concentration of lanthanum oxide in the support material was 4 wt. %.

The specific surface area of the material decreased from 143 m$^2$/g to 131 m$^2$/g due to the subsequent impregnation procedure.

Support Material 3

To prepare support material 3, 2000 g of support material 1 were impregnated with 856 g of a lanthanum nitrate solution with a lanthanum oxide content of 16 wt. %, using the pore volume impregnation method. The impregnation solution had a pH of 4. The powder obtained in this way was then dried for 12 hours at 120° C. and then calcined for 1 hour at 500° C. in air.

Due to this subsequent impregnation, an additional 7 wt. % of lanthanum oxide was deposited on the support material, so that the total concentration of lanthanum oxide in the support material was 10 wt. %. The specific surface area of the material decreased from 143 m$^2$/g to 123 m$^2$/g.

SIMS depth profiles were determined for lanthanum and aluminum in the three support materials, using the method described above. FIGS. 1 to 3 show the SIMS spectra for lanthanum as a function of the time of bombardment of the sample surface with argon ions, in three-dimensional images. Each spectrum corresponds to a specific abraded depth. The last spectrum in these images corresponds to an abraded depth of about 100 atomic layers.

The depth profile for support material 1 shows a reduced lanthanum concentration at the surface, but this changes to a constant concentration, with increasing depth of abrasion. The depth profiles for the support materials prepared according to the invention, on the other hand, show a clearly increased lanthanum concentration in an edge zone of a few atomic layers, which falls away to a constant value with increasing depth of abrasion.

Table 1 gives the ratio of SIMS intensities determined for aluminum to the intensities determined for lanthanum for three different depths of abrasion, initially (at the surface), in the middle, and at the end of the test.

TABLE 1

Quotients of SIMS intensities for Al/La.

| Site of measurement | Support material 1 | Support material 2 | Support material 3 |
|---|---|---|---|
| Start | 70.8 | 63.8 | 17.9 |
| Middle | 69.7 | 101 | 19.4 |
| End | 75.1 | 113 | 24.0 |

As shown by these results, the Al/La ratio changes, in support materials 2 and 3 prepared according to the invention, by a factor of 2 from the surface to a depth of about 100 atomic layers. Accordingly, the concentration of lanthanum is enriched at the surface of the particles of support material.

Car exhaust gas catalysts were prepared using support materials 1 to 3, and their light off temperatures for the conversion of hydrocarbons and carbon monoxide were determined. The catalysts were intended for use as start catalysts located close to the engine and which are subjected to very high temperatures during operation. The support structures for all the catalysts were honeycomb structures made of cordierite with a volume of 0.3 l and a cell density of 46.5 cm$^{-2}$.

EXAMPLE 1

120 g of support material 1 were mixed with 20 g of a cerium/zirconium mixed oxide (70 wt. % cerium oxide and 30 wt. % zirconium oxide with a BET surface area in the freshly calcined state of 87 m$^2$/g) impregnated with 0.7 g of platinum and 3.2 g of palladium using the pore volume impregnation method. The impregnated mixture was then dried and calcined at 500° C. in air.

This powder was stirred with water to give an aqueous suspension and milled to a particle size of 3 to 5 lm (d$_{50}$). The oxidic solids in the dispersion were applied to one of the support structures provided, using an immersion method. The loading concentration was 160 g of catalyst material per liter of honeycomb structure volume.

EXAMPLE 2

A catalyst was prepared using the same method as described in example 1, but using support material 2.

EXAMPLE 3

A catalyst was prepared using the same method as described in example 1, but using support material 3.

Application Example

All the catalysts were aged for 4 hours at 1100° C. in an atmosphere consisting of 88 vol. % nitrogen, 10 vol. % water and 2 vol. % oxygen before measuring the light off temperatures in the engine.

The light off temperatures were measured in a 2l petrol engine. For this purpose, the catalysts were increasingly heated with normalized air to fuel ratios of 0.999 (1 Hz±0.5 A/F) and 1.05 (static) or 1.1 (static) and subjected to a space velocity of 206000 h$^{-1}$. During the heating process, the conversions of hydrocarbons and carbon monoxide were determined as a function of the temperature. The temperatures for a conversion of 50% for each of the harmful substances were determined from these measurements for the individual catalysts.

The results determined are shown graphically in FIGS. 4 to 6. As can be seen from these results, the catalysts in examples 2 and 3 which were prepared using support materials according to the invention are characterized by a substantially reduced light off temperature, although, due to the subsequent impregnation procedure, the specific surface area of the support materials was less than the specific surface area of the support material used in example 1.

Further variations and modifications of the foregoing will be apparent to those skilled in the art and are intended to be encompassed by the claims appended hereto.

German priority application 199 08 394.0 is relied on and incorporated herein by reference.

We claim:

1. A powdered catalyst material comprising aluminum oxide, at least one basic metal oxide, and at least one catalytically active noble metal, wherein the aluminum oxide and the at least one basic metal oxide form a composite support material for a catalytically active component, wherein the catalyst material has a specific surface area of more than 80 m²/g, and wherein a concentration of the at least one basic metal oxide in an outer edge zone with a thickness of less than 100 atomic layers, relative to a concentration of aluminum, is at least 20% greater than a concentration of the at least one basic metal oxide, relative to a concentration of aluminum, at a depth with a thickness of more than 100 atomic layers from the surface of said composite support material.

2. The catalyst material according to claim 1, wherein the at least one basic metal oxide is at least one member selected from the group consisting of alkaline earth metal oxides and rare earth metal oxides.

3. The catalyst material according to claim 2, wherein the at least one basic metal oxide comprises at least one member selected from the group consisting of lanthanum oxide and cerium oxide.

4. The catalyst material according to claim 3, wherein the at least one basic metal oxide is present in a concentration of between 1 and 35 wt. %, with respect to the total weight of the catalyst material.

5. The catalyst material according to claim 4, wherein the at least one noble metal comprises at least one member selected from the group consisting of platinum, palladium, rhodium, iridium, and mixtures thereof, and is present in a concentration of 0.01 to 5 wt. %, with respect to the total weight of the catalyst material.

* * * * *